Sept. 1, 1953  W. H. DUPREE, JR  2,651,028
SIGNAL LAMP UNIT FOR AUTOMOBILES
Filed Nov. 27, 1950
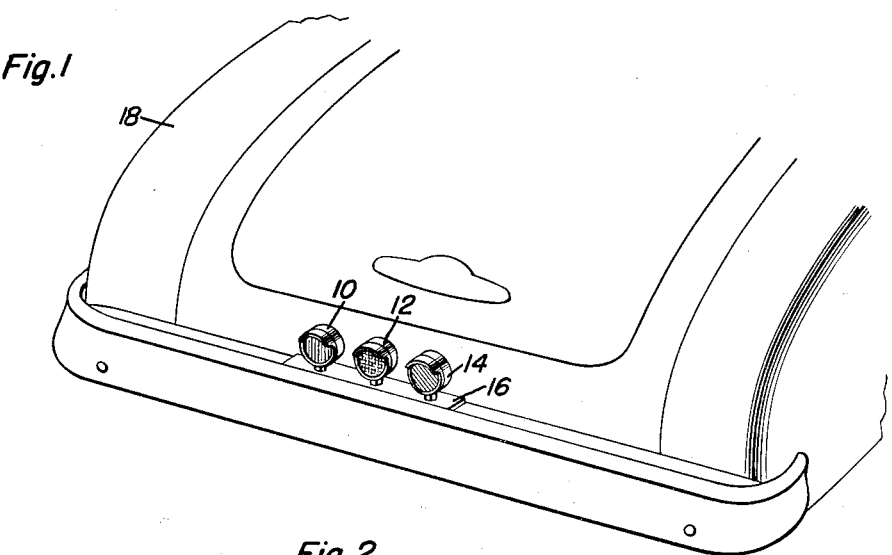
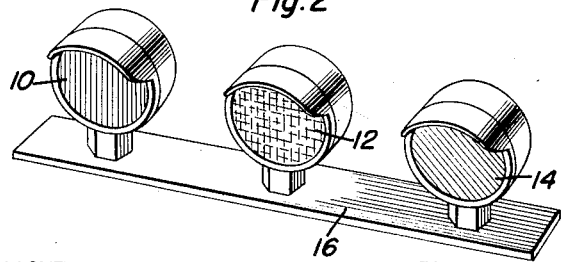
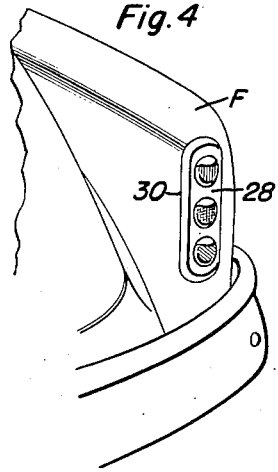
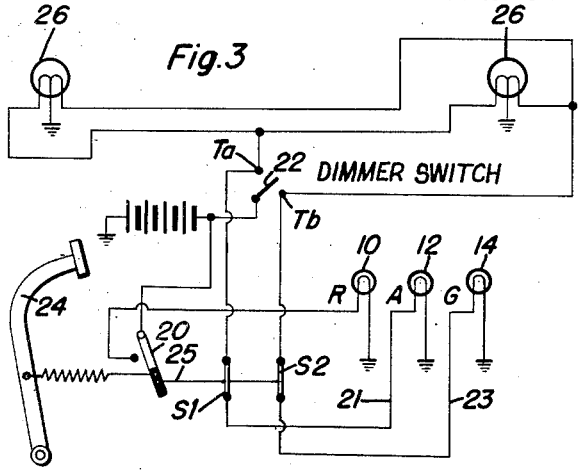
Inventor
William H. Dupree, Jr.
By *Clarence A. O'Brien and Harvey B. Jackson*
Attorneys Patented Sept. 1, 1953

2,651,028

UNITED STATES PATENT OFFICE 2,651,028

SIGNAL LAMP UNIT FOR AUTOMOBILES

William H. Dupree, Jr., Pine Bluff, Ark.

Application November 27, 1950, Serial No. 197,790

5 Claims. (Cl. 340—66)

This invention relates to new and useful improvements in signal devices for vehicles and the primary object of the present invention is to provide a night driving courtesy traffic light for vehicles that will indicate a stop and whether or not the road is clear for passing.

Another very important object of the present invention is to provide a signal lamp unit for vehicles consisting of an amber lamp that is connected to the dimmer switch of a vehicle and a green lamp that is also connected to the dimmer switch so that when the headlights of a vehicle are bright the green light will be illuminated but when the switch is actuated to dim the headlights of the vehicle, the green lamp will be deenergized and the amber lamp will be illuminated to inform a driver approaching the signal equipped vehicle that the road is not clear for passing.

A further object of the present invention is to provide a night driving courtesy traffic signal including three colored lamps of red, amber and green respectively, that are mounted on a common base to form a unitary structure and which lamps are quickly and readily connected to the usual light circuit of a vehicle in a convenient manner to be selectively activated.

A still further aim of the present invention is to provide a courtesy traffic signal that is simple and practical in construction, small and compact in structure, neat and attractive in appearance, inexpensive to manufacture, and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention mounted on the rear of a vehicle;

Figure 2 is a perspective view of the present invention removed from a vehicle;

Figure 3 is a schematic view showing the electrical circuit used in the present invention; and, Figure 4 a perspective view of the present invention in slightly modified form.

Referring now to the drawings in detail, wherein for the purpose of illustration, there is disclosed a preferred embodiment of the present invention, the numerals 10, 12 and 14 represent a red lamp, an amber lamp and a green lamp respectively, that are mounted on a single base plate 16. The lamps 10, 12 and 14 are referred to by their particular color since they are mounted in casings having colored windows or else the casing windows are clear and the bulbs in the casings are colored so that light rays passing from the lamps 10, 12 and 14 will be red, amber and green respectively.

The base plate 16 is mounted on the rear of a vehicle 18, the lamp 10 is electrically connected to the brake-pedal operated switch 20 of the vehicle 18 by a conductor, the lamp 12 is electrically connected by a conductor to one terminal (dim side) Ta of the vehicle's headlight dimmer switch 22 and the lamp 14 is connected by a conductor to the other terminal (bright side) Tb of the dimmer switch.

The conductors 21 and 23 connecting the lamps 12 and 14 respectively, to the terminals Ta and Tb are provided with switches S1 and S2 that are connected to the switch 20 by an arm 25 so that as the foot pedal 24 is depressed to complete the circuit to the lamp 10, the circuits to the lamps 12 and 14 will be broken. Through this arrangement, but a single one of the lamps 10, 12, 14 will be energized at one time.

In practical use of the present invention, as the foot pedal 24 is depressed, the switch 20 is closed and the lamp 10 becomes illuminated to indicate a stop. When the bright headlights 26 are on, the lamp 14 is illuminated to indicate a clear road ahead and when the dimmer switch is actuated to dim the headlights 26, the lamp 14 will be deenergized and the lamp 12 will be illuminated to indicate that the road is not clear for passing.

Figure 4 shows the light unit mounted in a casing 28 that is mounted in an opening 30 in the rear fender of a vehicle. The casing supports three glass windows of red, amber and green color that register with bulbs that are connected in the same manner previously described.

In the event that a red light must be illuminated on the vehicle at all times when the lights are on, the red lamp will have a two wire and bulb arrangement. One of the wires and bulbs will be connected to the headlight circuit of the vehicle and the other wire and bulb will be connected to the brake light switch.

Having described the invention, what is claimed as new is:

1. In a vehicle having a brake-pedal and a headlight dimmer switch, a night driving courtesy traffic light comprising a brake pedal operated switch electrically connected to the dimmer switch, a first lamp electrically connected to the brake-pedal operated switch to be energized as the brake-pedal operated switch is moved to its circuit closing position and including a red colored face plate, a second lamp electrically connected to one terminal of the dimmer switch to be illuminated when the dimmer switch is actuated to dim the headlights of the vehicle and including an amber colored face plate, and a third lamp electrically connected to the other terminal of the dimmer switch to be energized when the dimmer switch is actuated to permit the headlights of the vehicle to be intensified from their dimmed position and including a green colored face plate, said first, second and third lamps being disposed in juxtaposition with their face plates facing rearwardly.

2. In a vehicle having a brake-pedal operated switch and a headlight dimmer switch, a night driving courtesy traffic light comprising a first lamp, means electrically connected to the brake-pedal operated switch and to the first lamp whereby the first lamp will be energized as the brake-pedal operated switch is moved to its circuit closing position, a second lamp, means electrically connected to one terminal of the dimmer switch and to the second lamp whereby the second lamp will be illuminated when the dimmer switch is actuated to dim the headlights of the vehicle, a third lamp, means electrically connected to the other terminal of the dimmer switch and to the third lamp whereby the third lamp will be energized when the dimmer switch is actuated to permit the headlights of the vehicle to be intensified from their dimmed position, a base supporting said lamps in side by side relationship, said first lamp being red, said second lamp being amber, and said third lamp being green.

3. In a vehicle having a headlight dimmer switch, a signal lamp unit for the vehicle comprising a single base, three lamps being supported on said base in side by side relationship, a brake pedal operated switch electrically connected to the dimmer switch, one of said lamps being red, another of said lamps being amber and the other of said lamps being green, said red lamp being electrically connected to the brake-pedal operated switch, the amber lamp being electrically connected to one terminal of the vehicle headlight dimmer switch and the green lamp being connected to the other terminal of a vehicle headlight dimmer switch.

4. The combination of claim 1 and a switch connected to the second lamp and a further switch connected to the third lamp, said switch members comprising means electrically connecting the second and third lamps to the dimmer switch, and said switch members connected to said second and third lamps also being connected to said brake-pedal operated switch and being moved to their circuit open position as the brake-pedal operated switch member is moved to its circuit closing position.

5. In a vehicle having a brake pedal and a headlight dimmer switch electrically connected to a source of electric current, three lamps supported in juxtaposition at the rear of the vehicle and comprising a first red lamp, a second amber lamp and a third red lamp, a brake pedal operated switch electrically connected to one terminal of the dimmer switch, said brake pedal operated switch having a contact electrically connected to the red lamp, means connecting said brake pedal to said brake pedal operated switch whereby the latter will be moved into engagement with said contact as the pedal is depressed to its brake applying position to energize the red lamp, first and second switch elements each having a movable contact and a stationary contact, said stationary contacts being electrically connected to said dimmer switch, the movable contact of the first switch element being electrically connected to the amber lamp, and the movable contact of the second switch being electrically connected to the second switch element, and means connecting said movable contacts together and to the brake pedal operated switch, whereby the movable contacts will engage the stationary contacts when the brake pedal is depressed to move the brake pedal operated switch to its circuit closing position.

WILLIAM H. DUPREE, Jr.

References Cited in the file of this patent
UNITED STATES PATENTS

| Number | Name | Date |
|---|---|---|
| 1,956,056 | Bellec et al. | Apr. 4, 1934 |
| 2,096,069 | Seiden | Oct. 19, 1937 |
| 2,128,769 | Finnell | Aug. 30, 1938 |
| 2,463,088 | Coombs | Mar. 1, 1949 |
| 2,464,535 | Smith, Jr. | Mar. 15, 1949 |
| 2,483,687 | Wisuri | Oct. 4, 1949 |